United States Patent
Cheng et al.

(10) Patent No.: US 12,185,417 B2
(45) Date of Patent: Dec. 31, 2024

(54) COMMUNICATION METHOD AND APPARATUS, AND STORAGE MEDIUM

(71) Applicant: Beijing Xiaomi Mobile Software Co., Ltd., Beijing (CN)

(72) Inventors: Jiayu Cheng, Beijing (CN); Jiatai Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 316 days.

(21) Appl. No.: 17/664,340

(22) Filed: May 20, 2022

(65) Prior Publication Data
US 2023/0209324 A1    Jun. 29, 2023

(30) Foreign Application Priority Data
Dec. 23, 2021 (CN) .......................... 202111593304.X

(51) Int. Cl.
| H04W 8/00 | (2009.01) |
| H04L 61/5014 | (2022.01) |
| H04W 8/12 | (2009.01) |
| H04W 84/12 | (2009.01) |
| H04W 88/16 | (2009.01) |

(52) U.S. Cl.
CPC ......... *H04W 8/005* (2013.01); *H04L 61/5014* (2022.05); *H04W 8/12* (2013.01); *H04W 84/12* (2013.01); *H04W 88/16* (2013.01)

(58) Field of Classification Search
None
See application file for complete search history.

(56) References Cited

U.S. PATENT DOCUMENTS

| 7,337,224 B1* | 2/2008 | Van Horne, III ... H04L 61/5014 709/224 |
| 8,751,617 B2* | 6/2014 | Claes ................. H04L 12/5692 709/225 |
| 2014/0334438 A1* | 11/2014 | Cohen-Arazi .... H04W 36/0077 370/331 |
| 2015/0281172 A1* | 10/2015 | He .......................... H04L 41/12 709/222 |
| 2020/0145370 A1* | 5/2020 | Zhang ................. H04L 61/4511 |
| 2021/0036983 A1* | 2/2021 | Vadde Makkalla ..... H04L 12/66 |

FOREIGN PATENT DOCUMENTS

JP          2011199732 A          10/2011

OTHER PUBLICATIONS

European Patent Office, Extended European Search Report Issued in Application No. 22176164.6, Nov. 10, 2022, Germany, 11 pages.

* cited by examiner

*Primary Examiner* — Hong S Cho
(74) *Attorney, Agent, or Firm* — McCoy Russell LLP

(57) ABSTRACT

A communication method includes: sending a dynamic host configuration protocol (DHCP) discovery packet in a network in response to a device triggering a wireless fidelity (WIFI) roaming event; receiving a DHCP offer packet which is for responding to the DHCP discovery packet; determining a target gateway according to the DHCP offer packet; and performing network communication through the target gateway.

15 Claims, 8 Drawing Sheets

COMMUNICATION METHOD AND APPARATUS, AND STORAGE MEDIUM

CROSS REFERENCE TO RELATED APPLICATION

The present application claims priority to Chinese Patent Application No. 202111593304.X, filed on Dec. 23, 2021. The entire contents of the above-listed application are hereby incorporated by reference for all purposes.

BACKGROUND

In a WIFI (wireless fidelity) technology, a terminal device may obtain network services through connection to an access point.

SUMMARY

The disclosure provides a communication method and apparatus, and a storage medium.

According to a first aspect of an embodiment of the present disclosure, a communication method is provided and includes:

sending a dynamic host configuration protocol (DHCP) discovery packet in a network in response to a device triggering a wireless fidelity (WIFI) roaming event;
receiving a DHCP offer packet which is for responding to the DHCP discovery packet;
determining a target gateway according to the DHCP offer packet; and
performing network communication through the target gateway.

According to a second aspect of an embodiment of the present disclosure, a communication apparatus is provided and includes:

a processor; and
a memory used to store an instruction executable by the processor.

The processor is configured to:

send a dynamic host configuration protocol (DHCP) discovery packet in a network in response to a device triggering a wireless fidelity (WIFI) roaming event;
receive a DHCP offer packet which is for responding to the DHCP discovery packet;
determine a target gateway according to the DHCP offer packet; and
perform network communication through the target gateway.

According to a third aspect of an embodiment of the present disclosure, a non-temporary computer-readable storage medium is provided. The storage medium stores a computer program instruction, and the program instruction, when being executed by a processor, implements steps of the communication method according to any of the first aspect above.

It should be understood that, the foregoing general description and the following detailed description provide examples and are explanatory only, and the present disclosure is not limited.

BRIEF DESCRIPTION OF THE FIGURES

The accompanying drawings, which are incorporated in and constitute a part of this specification, illustrate embodiments consistent with the present disclosure, and together with the specification serve to explain the principles of the present disclosure.

DETAILED DESCRIPTION

Examples will be described in detail herein, instances of which are illustrated in the accompanying drawings. When the following description refers to the drawings, the same numerals in different drawings refer to the same or similar elements unless otherwise indicated. Implementations described in the examples below are not intended to represent all implementations consistent with the present disclosure. On the contrary, they are merely instances of apparatus and methods consistent with some aspects of the present disclosure as recited in the appended claims.

Before introducing a communication method and apparatus and a storage medium provided by the present disclosure, an application scene of the present disclosure is introduced first.

Figure 1:
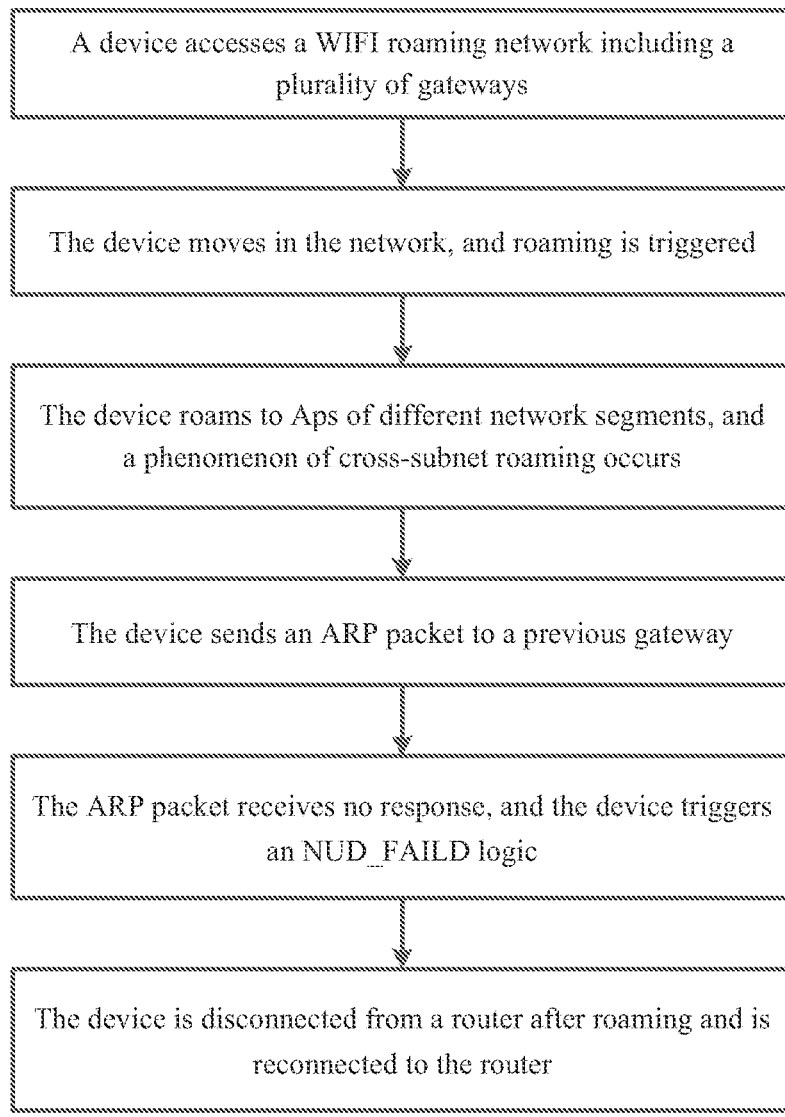
FIG. 1 is a flow chart of device communication illustrated according to an example.

FIG. 1 is a flow chart of device communication illustrated by the present disclosure. Referring to FIG. 1, in a related scene, a WIFI roaming network composed of a plurality of Aps (access points) may be set. The plurality of Aps may be located at different network segments, and gateways may be set for the network segments correspondingly. In this way, when a device accesses the WIFI roaming network, the device may perform WIFI roaming according to signal strengths of the Aps.

As an instance, the device may roam from AP1 to AP2. Specifically, AP1 is located at network segment 1, a gateway of network segment 1 is gateway 1, AP2 is located at network segment 2, and a gateway of network segment 2 is gateway 2. After WIFI roaming, the device may send an ARP (address resolution protocol) packet for network probing.

The applicant discovered that, because gateway information saved by the device is gateway 1 corresponding to AP1 before roaming, the device may send the ARP packet to gateway 1. However, the device is already located at the network segment of gateway 2 after roaming, so the ARP packet cannot be transmitted to gateway 1, nor can the device receive a response packet to the ARP packet. Based on a roaming mechanism of the device, a phenomenon of network disconnection of the device may be caused, which results in an influence on a user.

For instance, in a Google roaming strategy, the device may trigger an NUD_FAILED mechanism under a condition of not receiving the response message to the ARP packet, which may result in that the device is disconnected and is reconnected to a router that is currently connected. At the moment, the user accessing a webpage or playing a game may experience network disconnection, which causes a poor online surfing experience.

Figure 2:
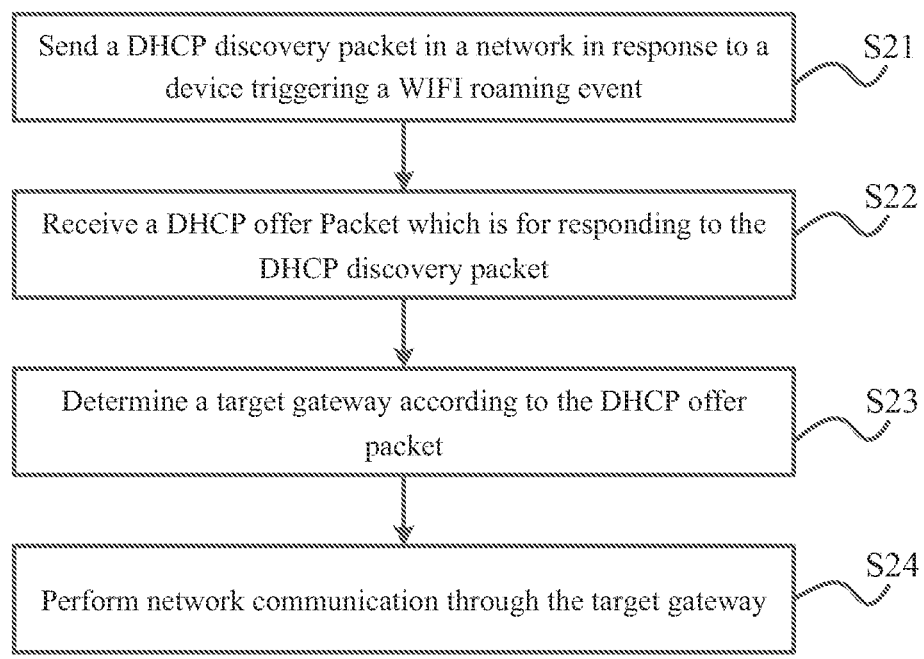
FIG. 2 is a flow chart of a communication method illustrated according to an example.

For this purpose, the present disclosure provides a communication method. FIG. 2 is a flow chart of a communication method illustrated according to an example. The method may, for instance, be applied to various devices, such as mobile phones, tablet computers, and wearable devices (such as watches and bracelets). As shown in FIG. 2, the method may include the following steps:

In step S21, in response to a device triggering a WIFI roaming event, a DHCP (dynamic host configuration protocol) discovery packet is sent in a network.

The communication method shown in FIG. 2 is described taking an Android device as an instance. In response to roaming of the Android device, a WIFI state machine on an application framework layer may receive an ASSOCIATED_BSSID_EVENT event notice. In this way, the Android device may, for instance, send the DHCP discovery packet in the network under a condition that roaming reassociation is completed.

The DHCP discovery packet may be a broadcast packet, so a host in a network segment where the Android device is located may receive the DHCP discovery packet. In response to receiving the DHCP discovery packet, a gateway in the network may generate a DHCP offer packet which is for responding to the DHCP discovery packet, and send the DHCP offer packet to the Android device.

In step S22, the DHCP offer packet which is for responding to the DHCP discovery packet is received.

In step S23, a target gateway is determined according to the DHCP offer packet.

For example, the Android device may obtain an IP (Internet protocol) address of the gateway sending the DHCP offer packet from the DHCP offer packet, and determine the target gateway according to the IP address.

In this way, in step S24, network communication is performed through the target gateway.

Figure 3:
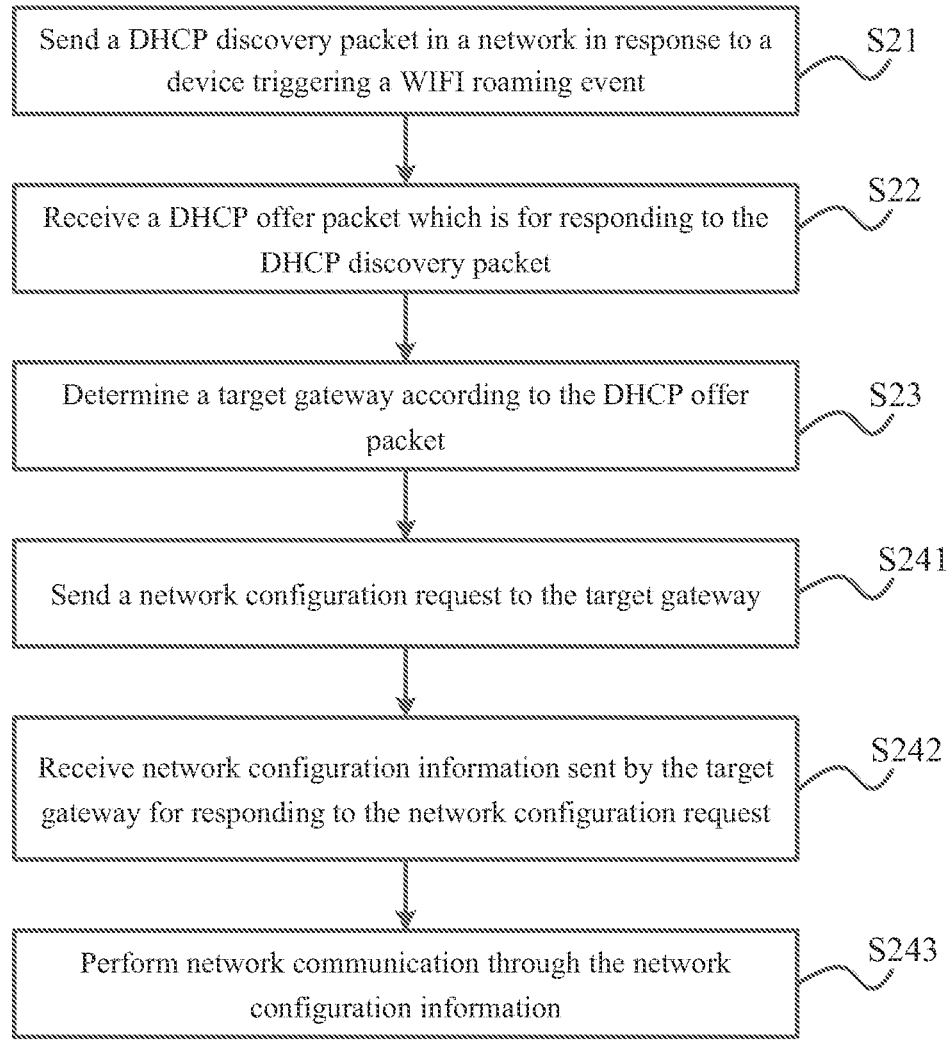
FIG. 3 is a flow chart of a communication method illustrated according to an example.

FIG. 3 is a flow chart of a communication method illustrated by the present disclosure. As shown in FIG. 3, in one possible implementation, the step of performing network communication through the target gateway (step S24) may include:

In step S241, a network configuration request is sent to the target gateway.

For example, after obtaining an IP address of the target gateway, the Android device may send the network configuration request to the target gateway, and the network configuration request may be used for requesting the target gateway to perform network configuration for the Android device.

In step S242, network configuration information sent by the target gateway for responding to the network configuration request is received.

Here, the network configuration information may include an IP address configured by the target gateway for the device. In some implementations, the network configuration information may further include a subnet mask, DNS (domain name system) information, etc. The present disclosure has no limitation on this.

In this way, after obtaining the network configuration information, in step S243, network communication is performed through the network configuration information.

By adopting the above technical solution, in response to triggering the WIFI roaming event, the device may send the DHCP discovery packet in the network, and receive the DHCP offer packet which is for responding to the DHCP discovery packet. In this way, the device may obtain information on a gateway that can provide DHCP services in the network through the DHCP offer packet. After obtaining the information of the gateway, the device may perform network communication through the gateway. In other words, the above technical solution can obtain gateway information of a subnet where the device is located in response to the device triggering the WIFI roaming event. In this way, even if a cross-subnet phenomenon occurs during a WIFI roaming process of the device, the device can obtain a gateway of a current subnet and perform communication through the gateway, so a problem of network disconnection is avoided.

Figure 4:
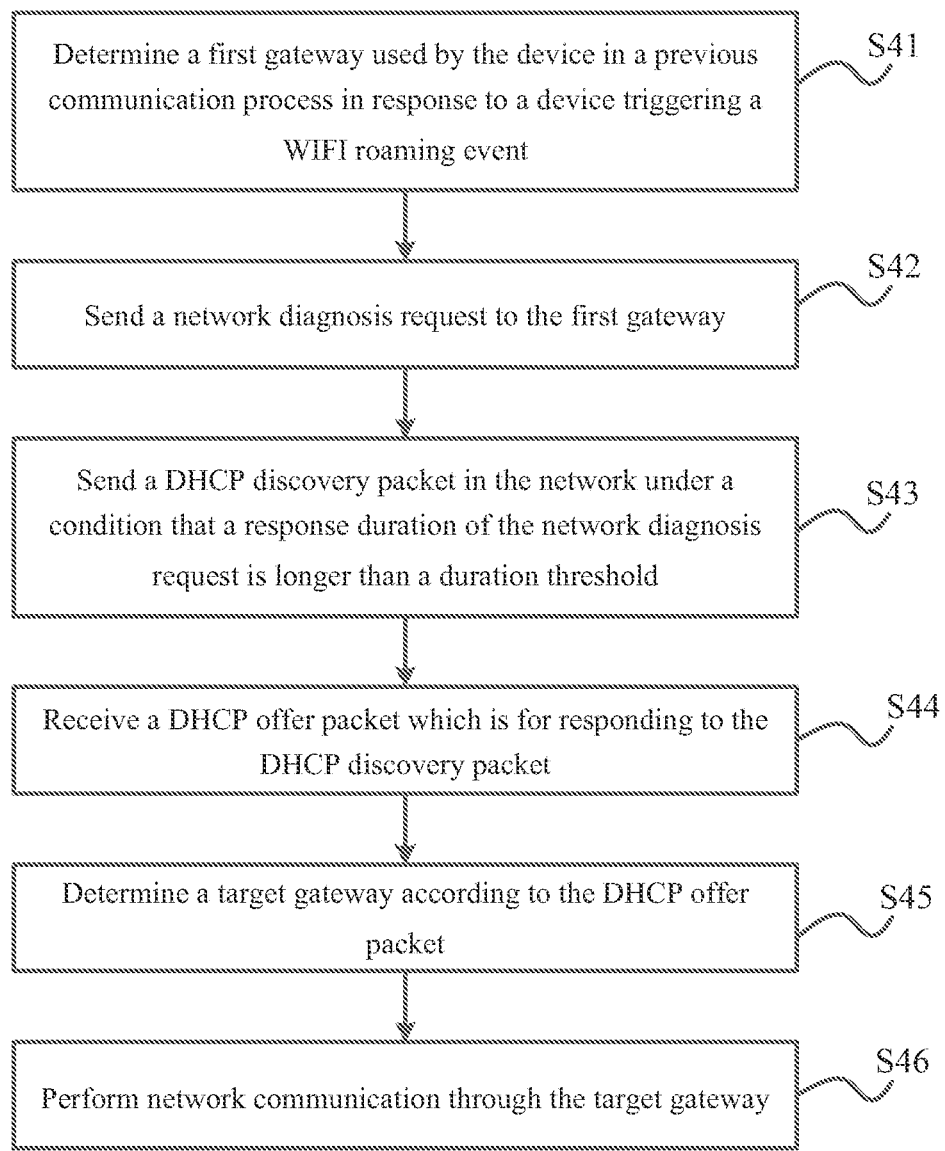
FIG. 4 is a flow chart of a communication method illustrated according to an example.

FIG. 4 is a flow chart of a communication method illustrated according to an example. The method may, for instance, be applied to various devices, such as mobile phones, tablet computers, and wearable devices. As shown in FIG. 4, the method may include the following steps:

In step S41, in response to a device triggering the WIFI roaming event, a first gateway used by the device in a previous communication process is determined.

As an instance, the device may roam from AP1 to AP2. Specifically, AP1 is located at network segment 1, a gateway of network segment 1 is gateway 1, AP2 is located at network segment 2, and a gateway of network segment 2 is gateway 2. Under this condition, the device may determine gateway 1 to be the first gateway.

In step S42, a network diagnosis request is sent to the first gateway.

For example, the device may send a ping (Packet Internet Groper) request packet to the first gateway, and wait to receive a ping response from the first gateway.

In step S43, the DHCP discovery packet is sent in the network under a condition that a response duration of the network diagnosis request is longer than a duration threshold.

Here, the duration threshold may be set based on application needs, which is not limited by the present disclosure. As an instance, the duration threshold may be 70 milliseconds, and in response to determining that the ping response from the first gateway returns in 70 milliseconds or in less than 70 milliseconds, the device may determine that network connection between the device and the first gateway is normal. Under this condition, the device may determine that WIFI roaming of the device does not cross network segments (subnets), so the device may perform network communication through the first gateway.

In response to determining that ping response from the first gateway does not return within 70 milliseconds, the device may determine that network connection between the device and the first gateway is abnormal. In other words, the device may roam to other network segments and cannot communicate with the first gateway. Under the condition that the response duration of the network diagnosis request is longer than the duration threshold, the device may send the DHCP discovery packet in the network.

In step S44, the DHCP offer packet which is for responding to the DHCP discovery packet is received.

In step S45, the target gateway is determined according to the DHCP offer packet.

In step S46, network communication is performed through the target gateway.

Specifically, for implementation of step S44 to step S46, reference may be made to description of the example of step S22 to step S24, and the present disclosure does not make any repeated description.

By adopting the above technical solution, in response to triggering the WIFI roaming event, the device may perform network diagnosis on the first gateway used by the device in the previous communication process. In response to determining that a network diagnosis result shows that the device cannot communicate with the first gateway normally, the device may obtain the gateway information of the subnet where the device is located through a manner of sending the DHCP discovery packet in the network. In this way, even if the cross-subnet phenomenon occurs during the WIFI roaming process of the device, the device can obtain the gateway of the current subnet and perform network communication through the gateway, so the problem of network disconnection is avoided.

In addition, in response to determining that the network diagnosis result shows that the device communicates with the first gateway normally, the device may determine that WIFI roaming does not cross network segments, and at the moment, network communication may be performed based on the first gateway without sending the DHCP discovery packet. Through such a manner, a sending frequency of the DHCP discovery packet can be reduced and network overhead is lowered.

Figure 5:
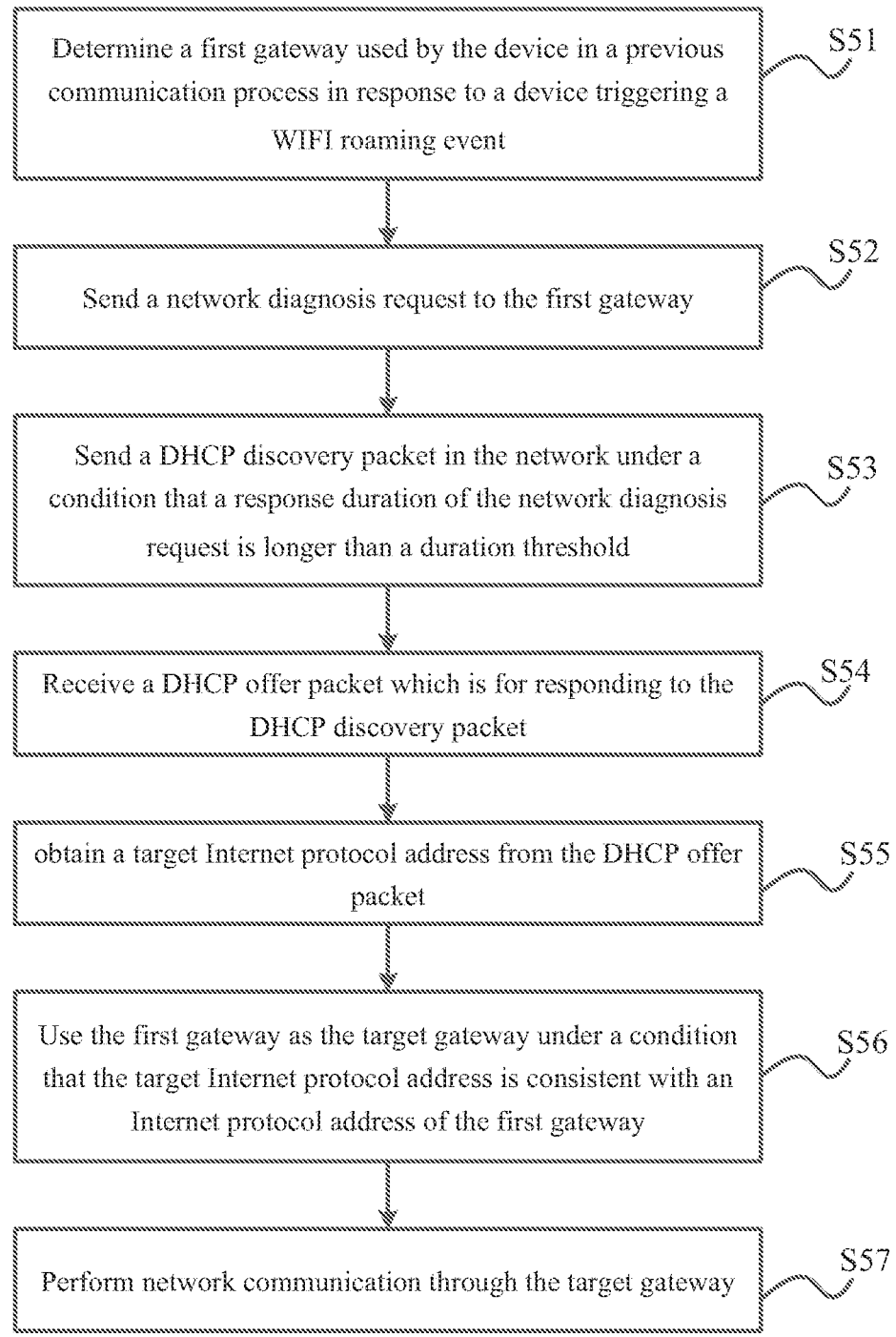
FIG. 5 is a flow chart of a communication method illustrated according to an example.

FIG. 5 is a flow chart of a communication method illustrated according to an example. Referring to FIG. 5, the method may include:

In step S51, in response to the device triggering the WIFI roaming event, the first gateway used by the device in a previous communication process is determined.

In step S52, the network diagnosis request is sent to the first gateway.

In step S53, the DHCP discovery packet is sent in the network under the condition that the response duration of the network diagnosis request is longer than the duration threshold.

In step S54, the DHCP offer packet which is for responding to the DHCP discovery packet is received.

Specifically, for implementation of step S51 to step S54, reference may be made to description of the example of step S41 to step S44, and the present disclosure does not make any repeated description for the purpose of conciseness of this specification.

In step S55, a target Internet protocol address is obtained from the DHCP offer packet. Here, the target Internet protocol address may be the IP address of the gateway sending the DHCP offer packet.

In step S56, the first gateway is used as the target gateway under a condition that the target Internet protocol address is consistent with an Internet protocol address of the first gateway.

It should be understood that, under the condition that the target Internet protocol address is consistent with the Internet protocol address of the first gateway, it may be determined that the DHCP offer packet is sent by the first gateway. In other words, no change of network segments is caused in the WIFI roaming process of the device, and the situation that the response duration of the network diagnosis request in step S53 is longer than the duration threshold may be caused by network fluctuation or relatively high load of the first gateway. The first gateway may be used as the target gateway.

In this way, in step S57, network communication is performed through the target gateway.

In the above technical solution, the device may determine whether cross-network-segment WIFI roaming of the device is caused through the network diagnosis request and the IP address in the DHCP offer packet. In response to occurrence of cross-network segment WIFI roaming, the device may obtain gateway information of a new network segment by launching a DHCP procedure, and may perform network communication through the gateway. In response to determining that no cross-network-segment WIFI roaming occur, the device may perform network communication through the first gateway (i.e. the gateway used in the previous communication process), and the DHCP procedure is not needed. Through such a manner, a launching frequency of the DHCP procedure can be reduced and the network overhead is lowered.

Figure 6:
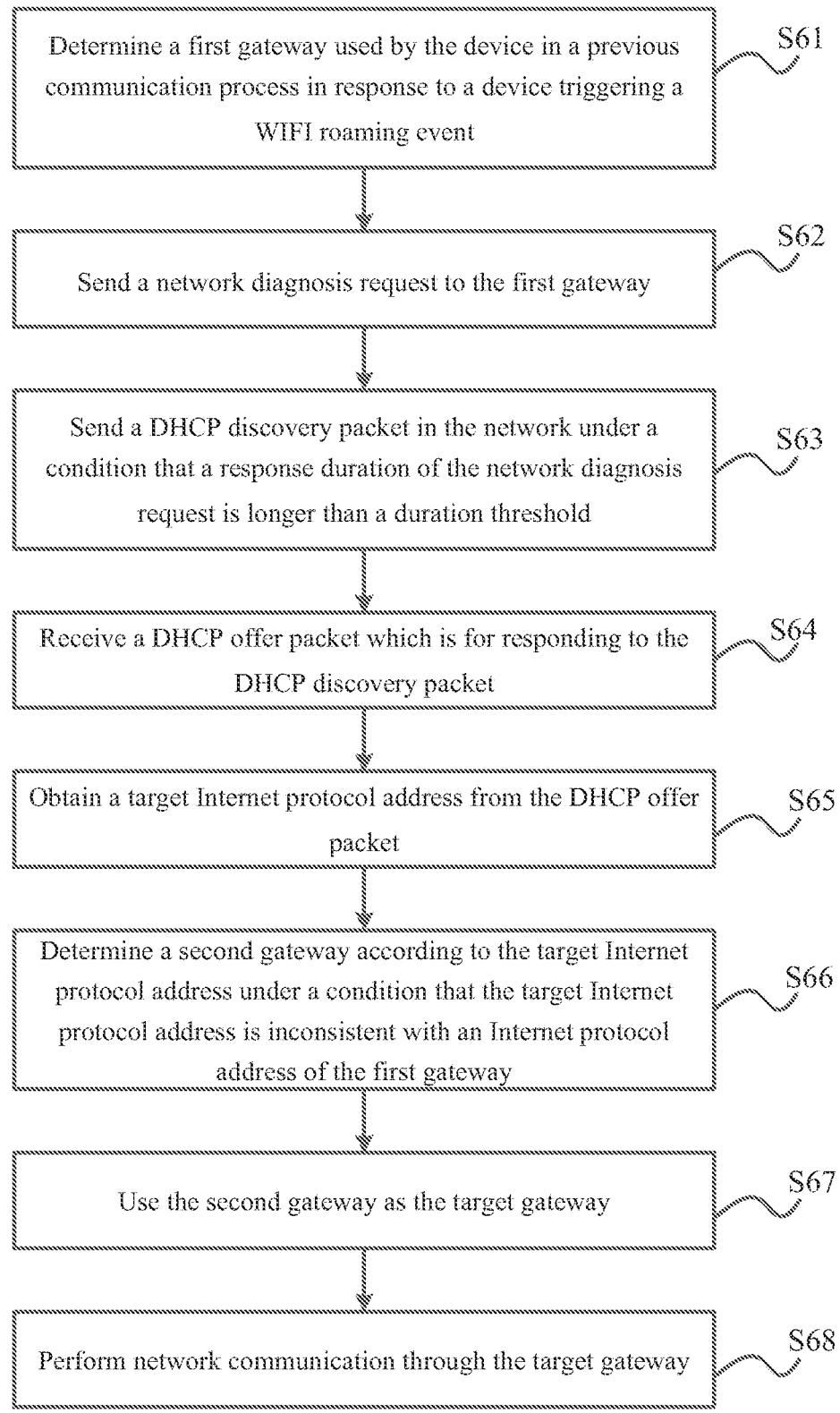
FIG. 6 is a flow chart of a communication method illustrated according to an example.

FIG. 6 is a flow chart of a communication method illustrated according to an example. Referring to FIG. 6, the method may include:

In step S61, in response to the device triggering the WIFI roaming event, the first gateway used by the device in the previous communication process is determined.

In step S62, the network diagnosis request is sent to the first gateway.

In step S63, the DHCP discovery packet is sent in the network under the condition that the response duration of the network diagnosis request is longer than the duration threshold.

In step S64, the DHCP offer packet which is for responding to the DHCP discovery packet is received.

In step S65, the target Internet protocol address is obtained from the DHCP offer packet. Here, the target Internet protocol address may be the IP address of the gateway sending the DHCP offer packet.

In step S66, a second gateway is determined according to the target Internet protocol address under a condition that the target Internet protocol address is inconsistent with the Internet protocol address of the first gateway.

It should be understood that, under the condition that the target Internet protocol address is inconsistent with the Internet protocol address of the first gateway, it may be determined that the DHCP offer packet is not sent by the first gateway. In other words, the device roams from a network segment corresponding to the first gateway to another network segment. Under this condition, in response to that the ARP packet is still sent to the first gateway, a situation that the ARP packet receives no response may occur, which may result in network disconnection of the device.

In this way, in step S67, the second gateway may be used as the target gateway.

In step S68, network communication is performed through the target gateway.

In the above technical solution, the device may determine whether the network segments is changed in the WIFI roaming process of the device through the network diagnosis request and the IP address of the DHCP offer packet, and in response to determining that the network segment is changed, the device may obtain gateway information of a new network segment by launching the DHCP procedure. In this way, the device may perform network communication through the gateway of the new network segment, so network disconnection of the device is avoided.

Figure 7:
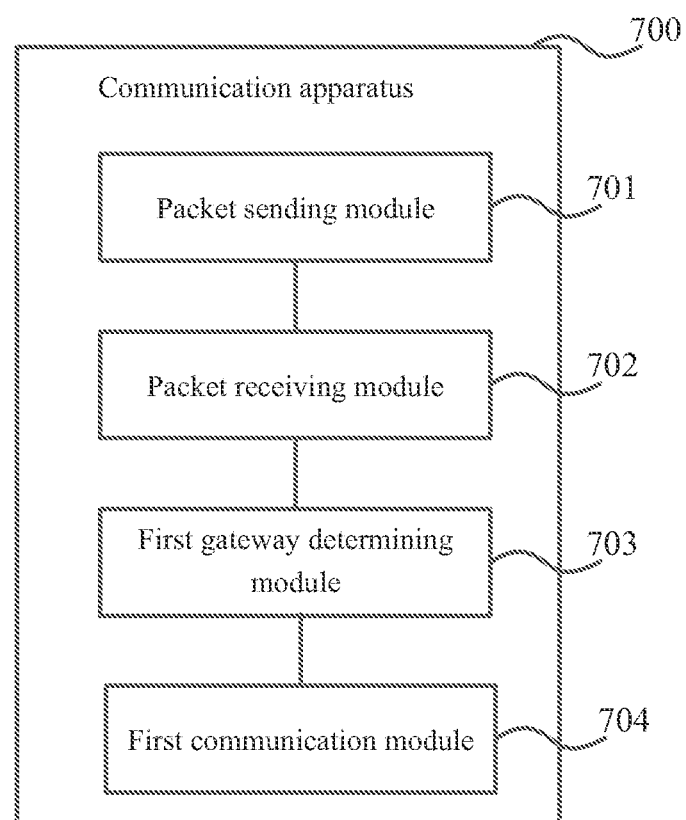
FIG. 7 is a block diagram of a communication apparatus illustrated according to an example.

Based on the same inventive concept, the present disclosure further provides a communication apparatus. FIG. 7 is a block diagram of a communication apparatus illustrated by the present disclosure. Referring to FIG. 7, the communication apparatus 700 includes:

a packet sending module 701, configured to send a dynamic host configuration protocol (DHCP) discovery packet in a network in response to a device triggering a wireless fidelity (WIFI) roaming event;

a packet receiving module 702, configured to receive a DHCP offer packet which is for responding to the DHCP discovery packet;

a first gateway determining module 703, configured to determine a target gateway according to the DHCP offer packet; and a first communication module 704, configured to perform network communication through the target gateway.

By adopting the above technical solution, in response to triggering the WIFI roaming event, the device may send the DHCP discovery packet in the network, and receive the DHCP offer packet which is for responding to the DHCP discovery packet. In this way, the device may obtain information on a gateway that can provide DHCP services in the network through the DHCP offer packet. After obtaining the information of the gateway, the device may perform network communication through the gateway. In other words, the above technical solution can obtain gateway information of a subnet where the device is located in response to the device triggering the WIFI roaming event. In this way, even if a cross-subnet phenomenon occurs during a WIFI roaming process of the device, the device can obtain a gateway of a current subnet and perform network communication through the gateway, so a problem of network disconnection is avoided.

In an example, the packet sending module 701 includes:

a first determining sub-module, configured to determine a first gateway used by the device in a previous communication process;

a first sending sub-module, configured to send a network diagnosis request to the first gateway; and a second sending sub-module, configured to send the DHCP discovery packet in the network under a condition that a response duration of the network diagnosis request is longer than a duration threshold.

In an example, the first gateway determining module 703 includes:

an address obtaining sub-module, configured to obtain a target Internet protocol address from the DHCP offer packet; and a first gateway determining sub-module, configured to determine the first gateway to be the target gateway under a condition that the target Internet protocol address is consistent with an Internet protocol address of the first gateway.

In an example, the first gateway determining module 703 further includes:

a second gateway determining sub-module, configured to determine a second gateway according to the target Internet protocol address under a condition that the target Internet protocol address is inconsistent with the Internet protocol address of the first gateway; and an execution sub-module, configured to use the second gateway as the target gateway.

In an example, the communication apparatus 700 further includes:

a second communication module, configured to perform network communication through the first gateway under a condition that the response duration of the network diagnosis request is shorter than or equal to the duration threshold.

In an example, the first communication module 704 includes:

a configuration request sending sub-module, configured to send a network configuration request to the target gateway;

a configuration receiving sub-module, configured to receive network configuration information sent by the target gateway for responding to the network configuration request, the network configuration information including an Internet protocol address configured for the device; and a communication sub-module, configured to perform network communication through the network configuration information.

With regard to the apparatus in the above embodiment, specific manners in which the modules perform operation have been described in detail in the embodiment related to the method, and no detailed description is made here.

The present disclosure further provides a communication apparatus, including:

a processor; and a memory used to store an instruction executable by the processor.

The processor is configured to:

send a dynamic host configuration protocol (DHCP) discovery packet in a network in response to a device triggering a wireless fidelity (WIFI) roaming event;

receive a DHCP offer packet which is for responding to the DHCP discovery packet;

determine a target gateway according to the DHCP offer packet; and perform network communication through the target gateway.

Of course, the processor may also be configured to execute steps of the communication method provided by the present disclosure.

The present disclosure further provides a non-temporary computer-readable storage medium. The storage medium stores a computer program instruction, and the program instruction, when being executed by a processor, implements steps of the communication method provided by the present disclosure.

Figure 8:
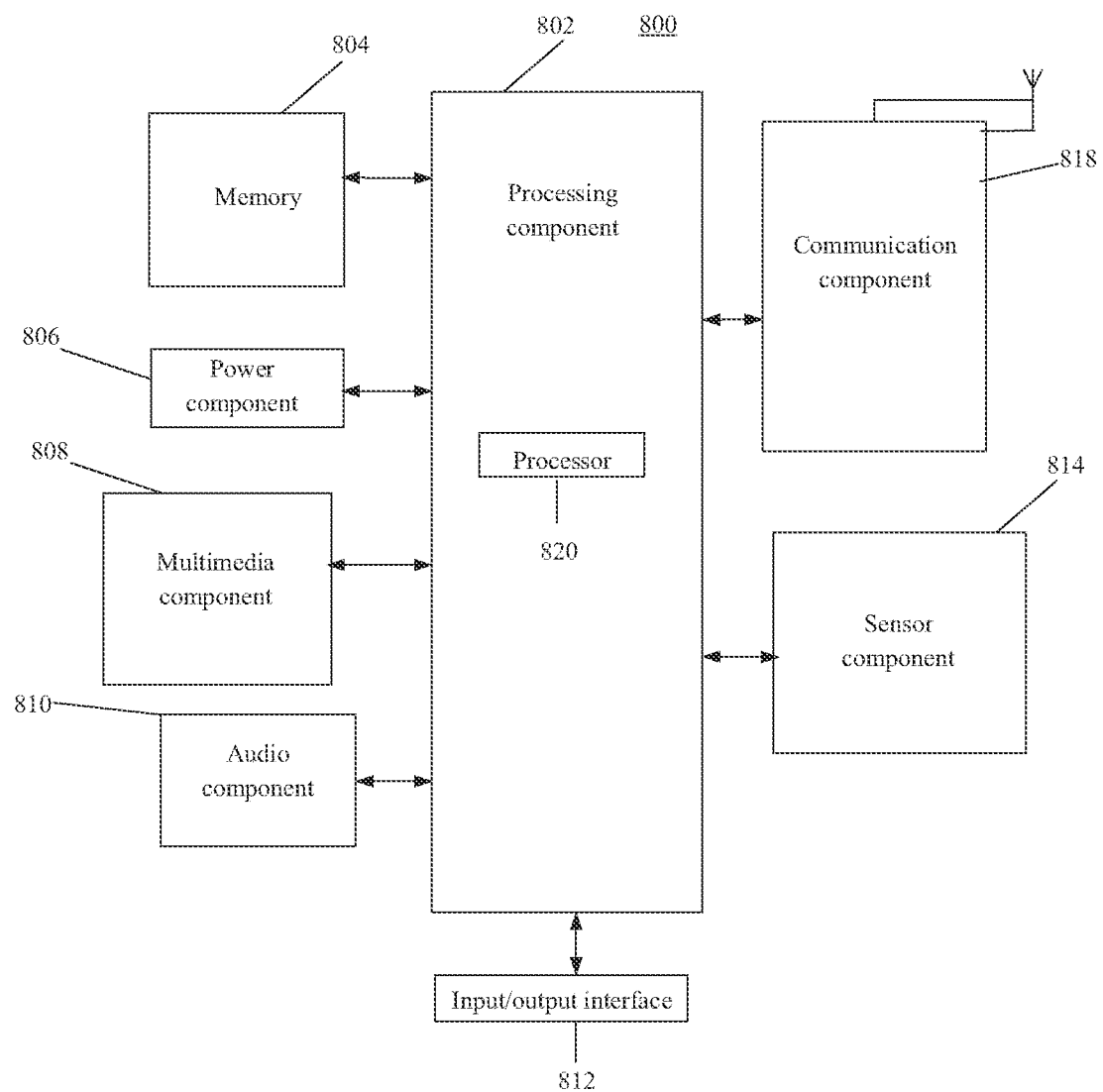
FIG. 8 is a block diagram of an apparatus used for communication illustrated according to an example.

FIG. 8 is a block diagram of an apparatus 800 used for communication illustrated according to an example. For instance, the apparatus 800 may be a mobile phone, a computer, a digital broadcasting terminal, a messaging device, a tablet device, a medical device, a fitness device, a personal digital assistant, etc.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the apparatus 800, such as operations associated with display, telephone calls, data communication, camera operations, and recording operations. The processing component 802 may include one or a plurality of processors 820 to execute instructions to complete all or part of steps of the above communication method. In addition, the processing component 802 may include one or a plurality of modules to facilitate interaction between the processing component 802 and other components. For example, the processing component 802 may include a multimedia module to facilitate interaction between the multimedia component 808 and the processing component 802.

The memory 804 is configured to store various types of data to support operations on the apparatus 800. Instances of these data include instructions for any application program or method operating on the apparatus 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable Programmable read-only memory (EPROM), a programmable read-only memory (PROM), a read-only memory (ROM), a magnetic memory, a flash memory, a magnetic disk or an optical disk.

The power component 806 provides power to various components of the apparatus 800. The power component 806 may include a power management system, one or a plurality of power supplies, and other components associated with generation, management, and distribution of the power for the apparatus 800.

The multimedia component 808 includes a screen that provides an output interface between the apparatus 800 and a user. In some embodiments, the screen may include a liquid crystal display (LCD) and a touch panel (TP). If the screen includes the touch panel, the screen may be implemented as a touch screen to receive input signals from the user. The touch panel includes one or a plurality of touch sensors to sense touch, wipe, and gestures on the touch panel. The touch sensor may not only sense a boundary of a touch or wipe action, but also detect a duration and pressure related to a touch or wipe operation. In some embodiments, the multimedia component 808 includes a front camera and/or a rear camera. When the apparatus 800 is in an operation mode, such as a shooting mode or a video mode, the front camera and/or the rear camera may receive external multimedia data. Each front camera and rear camera may be a fixed optical lens system or have focal length and optical zoom capabilities.

The audio component 810 is configured to output and/or input audio signals. For instance, the audio component 810 includes a microphone (MIC). When the apparatus 800 is in the operation mode, such as a call mode, a recording mode, and a voice recognition mode, the microphone is configured to receive external audio signals. The received audio signal may be further stored in the memory 804 or sent via the communication component 816. In some embodiments, the audio component 810 further includes a speaker for outputting audio signals.

The I/O interface 812 provides an interface between the processing component 802 and a peripheral interface module. The above peripheral interface module may be a keyboard, a click wheel, buttons, and the like. These buttons may include but are not limited to: a home button, a volume button, a start button, and a lock button.

The sensor component 814 includes one or a plurality of sensors to provide the apparatus 800 with various aspects of status assessment. For instance, the sensor component 814 may detect an on/off status of the apparatus 800 and relative positioning of a component. For instance, the component is a display and a keypad of the apparatus 800. The sensor component 814 may also detect a position change of the apparatus 800 or a component of the apparatus 800, presence or absence of contact between the user and the apparatus 800, orientation or acceleration/deceleration of the apparatus 800, and a temperature change of the apparatus 800. The sensor component 814 may include a proximity sensor configured to detect presence of a nearby object when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 may access a wireless network based on a communication standard, such as WiFi, 2G or 3G, or a combination thereof. In an example, the communication component 816 receives a broadcast signal or broadcast related information from an external broadcast management system via a broadcast channel. In an example, the communication component 816 further includes a near field communication (NFC) module to facilitate short-range communication. For instance, the NFC module may be implemented based on radio frequency identification (RFID) technology, infrared data association (IrDA) technology, ultra-wideband (UWB) technology, Bluetooth (BT) technology and other technologies.

In an example, the apparatus 800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components, so as to execute the above communication method.

In an example, a non-transitory computer-readable storage medium including instructions is further provided, for instance, a memory 804 including the instructions. The above instructions may be executed by a processor 820 of an apparatus 800 to complete the above communication method. For instance, the non-transitory computer-readable storage medium may be a ROM, a random access memory (RAM), a CD-ROM, a magnetic tape, a floppy disk, an optical data storage device, etc.

In another example, a computer program product is further provided. The computer program product contains a computer program that can be executed by a programmable apparatus, and the computer program has a code part that is used to execute the above communication method when being executed by the programmable apparatus.

Additional non-limiting embodiments of the disclosure include:

1. A communication method, includes:
    sending a dynamic host configuration protocol (DHCP) discovery packet in a network in response to a device triggering a wireless fidelity (WIFI) roaming event;
    receiving a DHCP offer packet which is for responding to the DHCP discovery packet;
    determining a target gateway according to the DHCP offer packet; and
    performing network communication through the target gateway.

2. The communication method according to embodiment 1, wherein the sending the dynamic host configuration protocol (DHCP) discovery packet in the network includes:
    determining a first gateway used by the device in a previous communication process;
    sending a network diagnosis request to the first gateway; and
    sending the DHCP discovery packet in the network under a condition that a response duration of the network diagnosis request is longer than a duration threshold.

3. The communication method according to embodiment 2, wherein the determining the target gateway according to the DHCP offer packet includes:
    obtaining a target Internet protocol address from the DHCP offer packet; and
    using the first gateway as the target gateway under a condition that the target Internet protocol address is consistent with an Internet protocol address of the first gateway.

4. The communication method according to embodiment 3, wherein the determining the target gateway according to the DHCP offer packet further includes:
  determining a second gateway according to the target Internet protocol address under a condition that the target Internet protocol address is inconsistent with the Internet protocol address of the first gateway; and
  using the second gateway as the target gateway.

5. The communication method according to embodiment 2, further includes:
  performing network communication through the first gateway under a condition that the response duration of the network diagnosis request is shorter than or equal to the duration threshold.

6. The communication method according to any one of embodiment 1 to 5, wherein the performing network communication through the target gateway includes:
  sending a network configuration request to the target gateway;
  receiving network configuration information sent by the target gateway for responding to the network configuration request, wherein the network configuration information comprises an Internet protocol address configured for the device; and
  performing network communication through the network configuration information.

7. A communication apparatus, includes:
  a packet sending module, configured to send a dynamic host configuration protocol (DHCP) discovery packet in a network in response to a device triggering a wireless fidelity (WIFI) roaming event;
  a packet receiving module, configured to receive a DHCP offer packet which is for responding to the DHCP discovery packet;
  a first gateway determining module, configured to determine a target gateway according to the DHCP offer packet; and
  a first communication module, configured to perform network communication through the target gateway.

8. The communication apparatus according to embodiment 7, the packet sending module includes:
  a first determining sub-module, configured to determine a first gateway used by the device in a previous communication process;
  a first sending sub-module, configured to send a network diagnosis request to the first gateway; and
  a second sending sub-module, configured to send the DHCP discovery packet in the network under a condition that a response duration of the network diagnosis request is longer than a duration threshold.

9. The communication apparatus according to embodiment 8, the first gateway determining module includes:
  an address obtaining sub-module, configured to obtain a target Internet protocol address from the DHCP offer packet; and
  a first gateway determining sub-module, configured to determine the first gateway to be the target gateway under a condition that the target Internet protocol address is consistent with an Internet protocol address of the first gateway.

10. The communication apparatus according to embodiment 9, the first gateway determining module further includes:
  a second gateway determining sub-module, configured to determine a second gateway according to the target Internet protocol address under a condition that the target Internet protocol address is inconsistent with the Internet protocol address of the first gateway; and
  an execution sub-module, configured to use the second gateway as the target gateway.

11. The communication apparatus according to embodiment 8, the communication apparatus further includes:
  a second communication module, configured to perform network communication through the first gateway under a condition that the response duration of the network diagnosis request is shorter than or equal to the duration threshold.

12. The communication apparatus according to any one of embodiment 7 to 11, the first communication module includes:
  a configuration request sending sub-module, configured to send a network configuration request to the target gateway;
  a configuration receiving sub-module, configured to receive network configuration information sent by the target gateway for responding to the network configuration request, the network configuration information including an Internet protocol address configured for the device; and
  a communication sub-module, configured to perform network communication through the network configuration information.

By adopting the above technical solution, in response to triggering the WIFI roaming event, the device may send the DHCP discovery packet in the network, and receive the DHCP offer packet which is for responding to the DHCP discovery packet. In this way, the device may obtain information on a gateway that can provide DHCP services in the network through the DHCP offer packet. After obtaining the information of the gateway, the device may perform network communication through the gateway. In other words, the above technical solution can obtain gateway information of a subnet where the device is located in response to the device triggering the WIFI roaming event. In this way, even if a cross-subnet phenomenon occurs during a WIFI roaming process of the device, the device can obtain a gateway of a current subnet and perform communication through the gateway, so a problem of network disconnection is avoided.

After considering the specification and practicing the present disclosure disclosed herein, those of skill in the art will easily think of other implementation solutions of the present disclosure. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are to be regarded as examples only, and the true scope and spirit of the present disclosure are pointed out by the appended claims.

It should be understood that the present disclosure is not limited to the precise structure that has been described above and shown in the drawings, and various modifications and changes can be made without departing from its scope. The scope of the present disclosure is only limited by the appended claims.

The invention claimed is:

1. A communication method, comprising:
  determining a first gateway used by the device in a previous communication process in response to a device triggering a wireless fidelity (WIFI) roaming event, and sending a dynamic host configuration protocol (DHCP) discovery packet in a network;

receiving a DHCP offer packet which is for responding to the DHCP discovery packet;

determining a target gateway according to the DHCP offer packet; and performing network communication through the target gateway; wherein the determining the target gateway according to the DHCP offer packet comprises:

obtaining a target Internet protocol address from the DHCP offer packet; and using the first gateway as the target gateway under a condition that the target Internet protocol address is consistent with an Internet protocol address of the first gateway.

2. The communication method according to claim 1, wherein the sending the dynamic host configuration protocol (DHCP) discovery packet in the network comprises:

sending a network diagnosis request to the first gateway; and sending the DHCP discovery packet in the network under a condition that a response duration of the network diagnosis request is longer than a duration threshold.

3. The communication method according to claim 2, further comprising:

performing network communication through the first gateway under a condition that the response duration of the network diagnosis request is shorter than or equal to the duration threshold.

4. The communication method according to claim 1, wherein the determining the target gateway according to the DHCP offer packet further comprises:

determining a second gateway according to the target Internet protocol address under a condition that the target Internet protocol address is inconsistent with the Internet protocol address of the first gateway; and using the second gateway as the target gateway.

5. The communication method according to claim 1, wherein the performing network communication through the target gateway comprises:

sending a network configuration request to the target gateway;

receiving network configuration information sent by the target gateway for responding to the network configuration request, wherein the network configuration information comprises an Internet protocol address configured for the device; and performing network communication through the network configuration information.

6. A communication apparatus, comprising:

a processor; and a memory used to store an instruction executable by the processor; wherein the processor is configured to:

determine a first gateway used by the device in a previous communication process in response to a device triggering a wireless fidelity (WIFI) roaming event, and send a dynamic host configuration protocol (DHCP) discovery packet in a network;

receive a DHCP offer packet which is for responding to the DHCP discovery packet;

determine a target gateway according to the DHCP offer packet;

perform network communication through the target gateway;

obtain a target Internet protocol address from the DHCP offer packet; and use the first gateway as the target gateway under a condition that the target Internet protocol address is consistent with an Internet protocol address of the first gateway.

7. The communication apparatus according to claim 6, wherein the processor is further configured to:

send a network diagnosis request to the first gateway; and send the DHCP discovery packet in the network under a condition that a response duration of the network diagnosis request is longer than a duration threshold.

8. The communication apparatus according to claim 7, wherein the processor is further configured to:

perform network communication through the first gateway under a condition that the response duration of the network diagnosis request is shorter than or equal to the duration threshold.

9. The communication apparatus according to claim 6, wherein the processor is further configured to:

determine a second gateway according to the target Internet protocol address under a condition that the target Internet protocol address is inconsistent with the Internet protocol address of the first gateway; and use the second gateway as the target gateway.

10. The communication apparatus according to claim 6, wherein the processor is further configured to:

send a network configuration request to the target gateway;

receive network configuration information sent by the target gateway for responding to the network configuration request, wherein the network configuration information comprises an Internet protocol address configured for the device; and perform network communication through the network configuration information.

11. A non-temporary computer-readable storage medium, storing a computer program instruction, wherein the program instruction is executed by a processor to:

determine a first gateway used by the device in a previous communication process in response to a device triggering a wireless fidelity (WIFI) roaming event, and send a dynamic host configuration protocol (DHCP) discovery packet in a network;

receive a DHCP offer packet which is for responding to the DHCP discovery packet;

determine a target gateway according to the DHCP offer packet;

perform network communication through the target gateway;

obtain a target Internet protocol address from the DHCP offer packet; and use the first gateway as the target gateway under a condition that the target Internet protocol address is consistent with an Internet protocol address of the first gateway.

12. The non-temporary computer-readable storage medium according to claim 11, wherein the program instruction is further executed by the processor to:

send a network diagnosis request to the first gateway; and send the DHCP discovery packet in the network under a condition that a response duration of the network diagnosis request is longer than a duration threshold.

13. The non-temporary computer-readable storage medium according to claim 12, wherein the program instruction is further executed by the processor to:

perform network communication through the first gateway under a condition that the response duration of the network diagnosis request is shorter than or equal to the duration threshold.

14. The non-temporary computer-readable storage medium according to claim 11, wherein the program instruction is further executed by the processor to:
determine a second gateway according to the target Internet protocol address under a condition that the target Internet protocol address is inconsistent with the Internet protocol address of the first gateway; and
use the second gateway as the target gateway.

15. The non-temporary computer-readable storage medium according to claim 11, wherein the program instruction is further executed by the processor to:
send a network configuration request to the target gateway;
receive network configuration information sent by the target gateway for responding to the network configuration request, wherein the network configuration information comprises an Internet protocol address configured for the device; and
perform network communication through the network configuration information.

* * * * *